United States Patent [19]

Vidwans

[11] 4,216,512
[45] Aug. 5, 1980

[54] DISC RECORDER WITH BRUSHLESS DC MOTOR DRIVE

[75] Inventor: Mohan P. Vidwans, Saline, Mich.

[73] Assignee: Sycor, Inc., Ann Arbor, Mich.

[21] Appl. No.: 935,510

[22] Filed: Aug. 21, 1978

[51] Int. Cl.$^2$ .............................................. G11B 23/00
[52] U.S. Cl. ...................................... 360/133; 360/97
[58] Field of Search ................................... 360/97–99, 360/133, 135, 102–103, 104–107; 358/128; 274/10 S; 361/212–213, 222; 339/5 S, 6 RL

[56] References Cited

U.S. PATENT DOCUMENTS

| | | | |
|---|---|---|---|
| 3,441,765 | 4/1969 | Maybury et al. | 339/5 S |
| 3,577,133 | 5/1971 | Garfein et al. | 360/97 |
| 3,964,101 | 6/1976 | Hino et al. | 360/99 |
| 4,040,089 | 8/1977 | Guarracini | 358/128 |
| 4,092,687 | 5/1978 | Butsch | 360/102 |
| 4,101,945 | 7/1978 | Butsch | 360/102 |

FOREIGN PATENT DOCUMENTS 815703 7/1949 Fed. Rep. of Germany ............. 360/97

*Primary Examiner*—John H. Wolff
*Attorney, Agent, or Firm*—Price, Heneveld, Huizenga & Cooper

[57] ABSTRACT

A drive and improved ground spindle assembly for a disc recorder and particularly one using a rigid disc having a direct coupled spindle shaft arrangement which includes a disc support platform mounted concentrically at one end of the spindle shaft and a DC motor attached to the other end of the spindle shaft is disclosed. The drive spindle assembly includes a disc support platform incorporating air impelling vanes on one side and bleed orifaces extending through the disc support platform so that air is drawn along the spindle assembly to cool it and then impelled outwardly over both sides of the recording disc to aerodynamically fly the recording heads on a thin film of air moving radially over the surface of the disc. The motor is a brushless DC type motor having a permanent magnet rotor driven by a rotating magnetic field. Provision of the brushless DC motor and unique ground and sealing means eliminate airborne contaminants that impair the operation of prior art disc recorders of this type.

16 Claims, 9 Drawing Figures

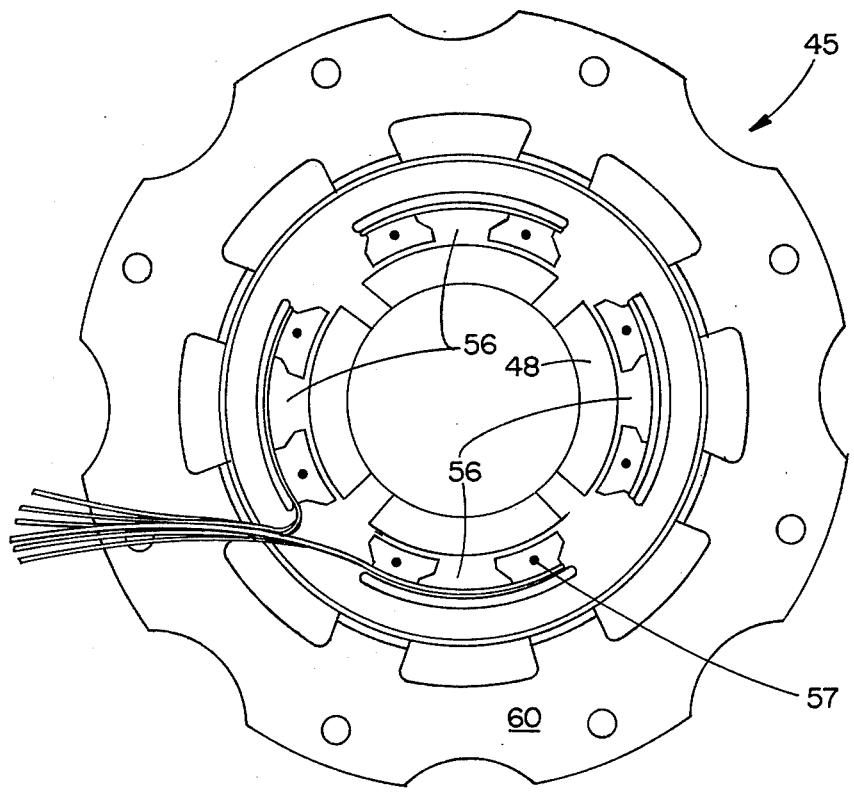
FIG. 4
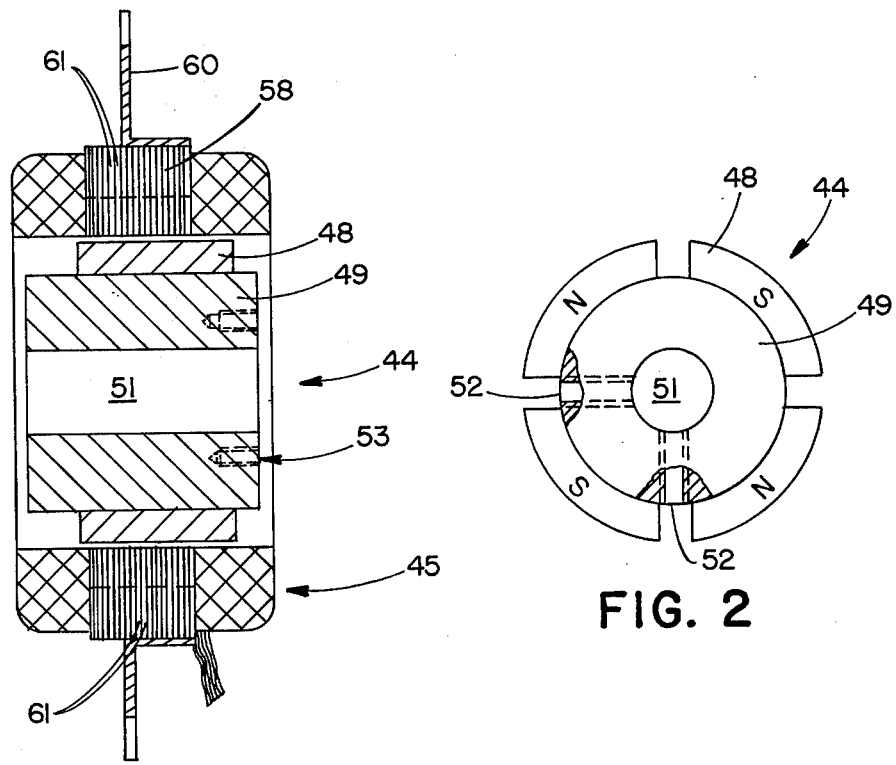
FIG. 3
FIG. 2

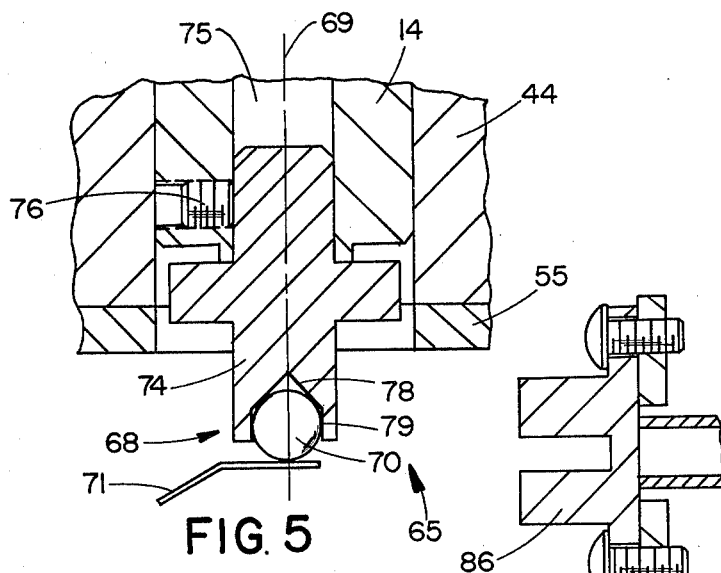
FIG. 5
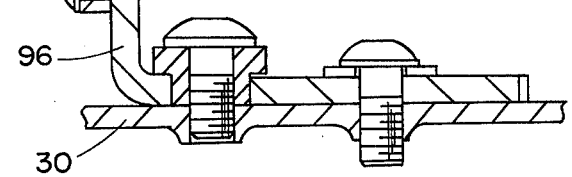
FIG. 9
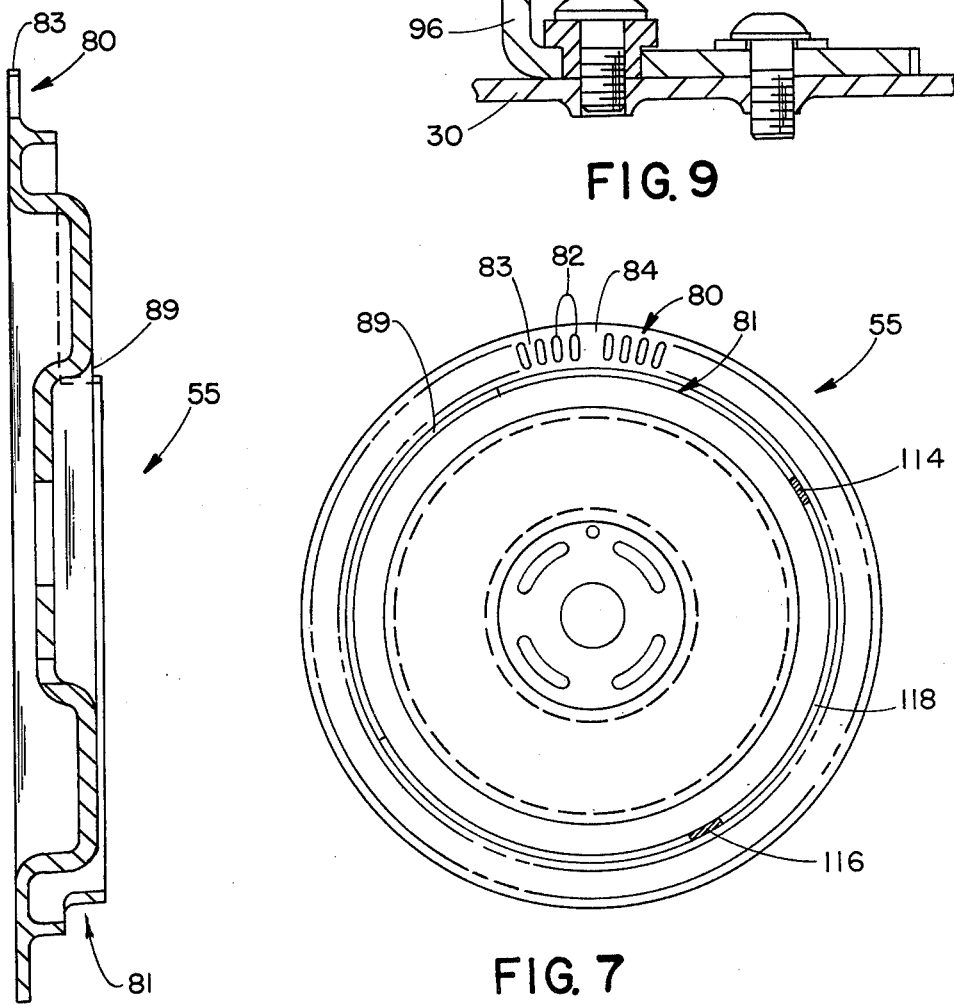
FIG. 6
FIG. 7

DISC RECORDER WITH BRUSHLESS DC MOTOR DRIVE

BACKGROUND OF THE INVENTION

The present invention relates generally to disc recorder drives and more particularly to a direct coupled disc recorder drive employing a brushless DC motor and an arrangement for packaging the same.

This application is an improvement of the disc recorder disclosed in the following related cases assigned to the same assignee. DISC FILE ASSEMBLY, U.S. Pat. No. 4,092,687; DRIVE SPINDLE ASSEMBLY FOR DISC FILE, U.S. Pat. No. 4,101,945 and COMBINED SPEED CONTROL AND SECTORING INDEX FOR DISC RECORDERS AND THE LIKE, filed Apr. 21, 1977, Ser. No. 789,528. The disclosures of these related applications are incorporated herein by reference. These three related cases disclose a disc recorder of the type having a direct coupled recording disc platform and motor with the recording disc platform mounted in a sealed enclosure. The recording disc platform includes an impeller for recirculating air through the enclosure both for cooling the spindle drive assembly and for aerodynamically flying the recording heads above the recording disc.

In direct coupled motor and spindle constructions of this type, the brushes used in the drive motor and the contacts in the shaft grounding arrangement will inherently produce small conductive dust or dirt particles as the brushes or the grounding contacts degrade through use. An accumulation of even a small amount of such particles on the recording disc or the recording heads will seriously impair the quality of recording and playback and must be prevented if at all possible. This can be a particular problem in disc recorders of the present type employing an impeller for circulating air within an enclosure for cooling the drive spindle assembly and aerodynamically flying the recording heads. If the direct coupled shaft extending from the enclosure to the motor is not effectively sealed, debris from the motor may be drawn upwardly along the spindle and impelled outwardly directly over the recording disc. This action is aggravated by the fact that the impeller vanes create a low pressure region at the bottom portion of the spindle shaft directly above the area of the motor and shaft seal. Although the sealing measures taken in prior art were generally satisfactory, in the event of seal deterioration, motor debris was carried into the recorder enclosure and the quality of recording suffered.

SUMMARY OF THE INVENTION

According to the present invention, these and other problems in the prior art are solved by provision of a brushless DC drive motor and an arrangement for packaging the same in a disc drive spindle assembly. The brushless DC motor is a type of motor employing a permanent magnet rotor and a stator winding which is electronically commutated to create a rotating magnetic field for driving the permanent magnet rotor. Elimination of the brushes used to commutate the rotor on a conventional DC electric motor eliminates the major source of dust and dirt particles within the disc recorder enclosure and eliminates the need for periodic brush maintenance in the field.

An improved grounding arrangement is provided for the direct coupled shaft that virtually eliminates contact wear. The grounding arrangement comprises an electrically conductive socket disposed on the axial centerline of the shaft. A carbon sphere is disposed in the socket and an electrically conductive leaf spring contacts and urges the sphere into the socket, the spring being electrically connected to ground. The design of the socket is such that the sphere rotates in a random fashion to eliminate contact wear. In more narrow aspects of the invention, an improved seal is provided and an arrangement for mounting the motor is provided that allows the motor to be retrofitted to prior art disc recorders in a small, flat physical package.

BRIEF DESCRIPTION OF THE DRAWINGS

FIG. 2 is an end view of a permanent magnet rotor comprising part of the drive spindle assembly shown in FIG. 1.

FIG. 3 is a cross-sectional side view of a stator winding and permanent magnet rotor comprising part of the drive spindle assembly of FIG. 1.

FIG. 4 is a bottom view of the stator winding.

FIG. 5 is a cross-sectional side elevation view of a grounding arrangement of the drive spindle assembly of FIG. 1.

FIG. 6 is a cross-sectional side view of a commutator disc forming part of the disc drive assembly of FIG. 1.

FIG. 7 is a bottom view of the commutator disc.

FIG. 9 is a cross-sectional elevation view of one of the transducers and arrangement for mounting the same to the drive spindle asssembly of FIG. 1.

DESCRIPTION OF THE PREFERRED EMBODIMENT

Figure 1:
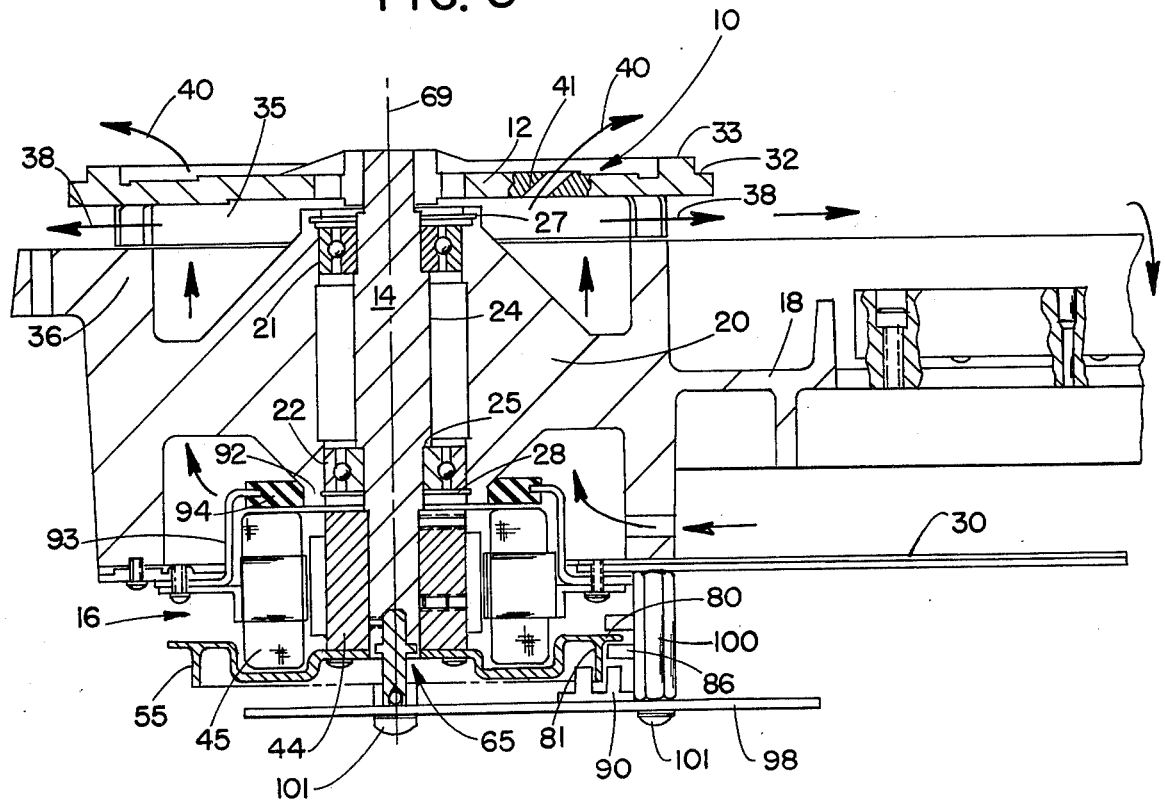
FIG. 1 is a fragmentary cross-sectional side elevation view of a disc recorder having a drive spindle assembly in accordance with an embodiment of this invention.

Referring to FIG. 1, a drive spindle assembly 10 includes a disc support platform, or a disc rotor 12, a shaft 14, and DC motor 16. The shaft 14 is an elongated, cylindrical member passing through the central axis of the rotor 12 and the DC motor 16. The shaft 14 is directly coupled to both the disc rotor 12 and the motor 16 for drive purposes. The drive spindle assembly 10 is mounted in a recorder frame 18 having a central hub portion 20. Bearings 21 and 22 are retained in suitable bosses formed in central hub portion 20 of the recorder frame 18. Preferably, the bearings 21 and 22 are held in their spaced position by shoulders 24 and 25 respectively, on the spindle shaft 14. The shoulders 24 and 25 are defined by areas of reduced diameter one shaft 14 on which the bearings seat. The shaft and bearings are retained in the central hub portion 20 of the frame 18 by split rings at 27 and 28. The spindle drive assembly 10 and the recorder frame 18 are normally surrounded by a sealed enclosure, a bottom portion of which is illustrated at 30.

The disc rotor 12 is disposed within the enclosure and serves both as an air pump and as a mounting platform for mounting a recording disc. The disc rotor 12 includes an annular surface 32 for extending around the perimeter of the rotor. The surface 32 provides a continuous coplanar support surface for the edge of a magnetic recording disc not illustrated in the present drawings. The recording disc is normally secured to the rotor 12 by a plurality of chips attached to the rotor 12 at 33 and extending over the recording disc supported by the surface 32. The rotor 12 also includes a series of air pumping vanes at 35 arranged in an annular formation about the underside of the rotor 12. The lowermost extremities of the vanes 35 are closely spaced above an annular shoulder 36 at the top of the recorder frame 18. The vanes 35 mainly pump air outwardly, radially of the rotor 12 in the direction of the arrows 38. Intake air for the vanes 35 is drawn upwardly past the hub portion 20 of the frame 18 by which the same may be cooled. The continuous recirculation of air within the enclosure serves to distribute heat generated by the disc drive assembly 10 to the entire recorder structure.

Apart from cooling purposes, air flow from the vanes 35 is used to provide a moving cushion or film of air along the top surface of the recording disc retained on the rotor 12. This flow of air, indicated by the arrows 40, serves to aerodynamically fly the recording head above the recording disc. The recording disc, the flying heads, and the structure for traversing the heads over the recording disc are conventional in nature and are not illustrated in the present figures. The desired film of air moving along the top of the disc is generated by a series of radially spaced openings in the top of the rotor 12 such as the opening illustrated at 41. The openings, such as the one illustrated at 41, bleed air from an area inside of the ring of vanes 35 on the underside of the rotor 12 and direct the same outwardly along the top of the recording disc in the direction of the arrows at 40. Further details regarding the construction and operation of the object recorder may be had from U.S. Pat. Nos. 4,101,945 entitled DRIVE SPINDLE ASSEMBLY FOR DISC FILE and 4,092,687 entitled DISC FILE ASSEMBLY incorporated herein by reference.

According to the invention, the motor 16 is preferably a brushless direct current motor. Brushless direct current motors are a known type of electric motor. However, unlike the conventional direct current motor, brushless direct current motors do not have mechanical commutators mounted on the rotor to switch the rotating field windings. In the case of a brushless direct current motor such as the one illustrated at 16 in FIG. 1, a permanent magnet rotor 44 cooperates with stator field windings at 45 to produce a torque on shaft 14. Referring now also to FIGS. 2 and 3, it is illustrated that the permanent magnet rotor 44 includes a plurality of ceramic permanent magnets 48 glued or otherwise suitably secured, on a rotor base 49. In this case, the permanent magnet rotor 44 includes four magnetic poles. The rotor base 49 includes a central aperture 51 through which the shaft 14 extends. The rotor base 49 is secured to the shaft 14 by set screws inserted in threaded apertures 52. Threaded apertures 53 axially disposed on the end of the rotor base 49 receive bolts which secure a commutator disc 55 to the end of the rotor 44.

A rotating magnetic field is set up by a stator winding 45. The stator winding 45 is best illustrated in FIGS. 3 and 4. The stator winding 45 includes a laminated core 58 and four windings disposed in slots 57 in the core 58 to generate four stator magnetic poles 56 to compliment the four permanent magnetic poles of the rotor. An apertured collar 60 is suitably secured to the stator core 58 so that the stator 45 may be bolted to the underside of the drive spindle assembly 10. Alternately, one or more of the laminations of the stator core at 61 may extend to the diameter of the collar 60 and include the necessary apertures for mounting the stator 45 to the underside of the drive spindle assembly 10. This eliminates the need for the apertured collar 60.

The stator 45 produces a rotating magnetic field which drives the rotor 44 and the spindle 14. Rotation of the stator magnetic field is electronically controlled by transistor switches. Commutation in the brushless DC motor 16 is a function of rotor position relative to the stator magnetic field. The switching sequence of the stator magnetic field is determined by the commutator disc 55. Rotor position is mechanically encoded in the commutator disc and optical or magnetic sensors are used as the mechanical and electrical interface between the rotor and the elctronic control. The circuits for switching the stator field windings in accordance with the position of the commutator disc 55 are conventional and no further description of these circuits is deemed necessary. With the mechanical commutator and brushes now eliminated by the timing disc and sensors, the major source of dust and dirt particles within the recorder enclosure is eliminated.

Referring now to FIGS. 1 and 5, an arrangement for grounding the spindle shaft 14 is provided at 65. The grounding arrangement 65 comprises an electrically conductive socket 68 disposed on the axial centerline 69 of the shaft 14. A carbon sphere 70 is disposed in the socket 68 and an electrically conductive leaf spring 71 contacts and urges carbon sphere 70 into the socket 68. The spring 71 is electrically connected to ground. In this case, the socket 68 is embodied in a plug 74 inserted axially in a bore 75 on the end of shaft 14. The plug 74 is secured to the end of shaft 14 by a set screw or the like at 76. Preferably, the socket 68, when viewed in cross section, is comprised of a conical portion 78 and a cylindrical portion 79. The conical portion 78 forms the deepest portion of the socket 68 and the axial centerlines of the conical and cylindrical portions of the socket 68 are disposed on the axial centerline 69 of the shaft 14. Also, preferably, the diameter of the cylindrical portion 79 of the socket 68 is larger than the diameter of carbon sphere 70 such that carbon sphere 70 contacts the socket 68 only in the conical portion of the socket. This grounding arrangement imparts a wandering spherical random motion to the carbon sphere 70 when the shaft 14 is rotated. Random movement of the sphere 70 virtually eliminates grounding contact wear and thus eliminates another source of dust and dirt particles in prior art drive spindle assemblies.

The commutator disc 55, best illustrated in FIGS. 6 and 7, includes first and second signal paths at 80 and 81, respectively. The first signal path 80 provides a signal for speed control of the motor 16. As best illustrated in FIG. 7, the signal path 80 comprises a plurality of radially disposed slots 82 disposed in flange 83. The slots 82 are equidistantly spaced along the first signal path 80 with the exception of the one missing slot at 84. A single speed transducer disposed at 86 in FIG. 1, produces an output signal pulse in response to the passing of each of the slots 82. As a result of having the slots spaced equally about the commutator disc 55, except at one point 84 where there is an increase in the spacing, the single transducer provides information both for controlling the speed and data indexing of the recording disc. The primary signal pulse output of the transducer 86 is compared to a reference pulse train having a repetition rate corresponding to the pulse repetition rate produced by the slots 82 when the recording disc is turning at a predetermined speed. However, the reference pulse train has an increased spacing between two pulses or a "missing pulse" corresponding to the increased, essentially double-spacing between slots 82 on the commutator disc at 84. If the time interval between signal pulses is greater than the time interval between the reference pulses, the disc rotational speed is increased. Analogously, if the time interval between signal pulses in smaller than the time interval between the reference pulses, the disc rotational speed is decreased. Further, the time interval between adjacent signal pulses exceeding a given amount indicates a missing pulse and is used to establish a circumferential reference point on the disc corresponding to the signal pulse following the interval termed an "index pulse". All sectors on the disc and thus all data recorded thereon, then can be located with respect to the index pulse and its associated reference point on the recording disc. For further detail of the speed control and indexing system, see patent application Ser. No. 789,528 filed Apr. 21, 1977 entitled COMBINED SPEED CONTROL AND SECTORING INDEX FOR DISC RECORDERS AND THE LIKE incorporated herein by reference.

The second signal path 81 is also an array of circumferentially spaced sectors comprising in this case, one sector 89 extending 90° about the commutator disc 55. The second signal path 89 cooperates with a pair of radially spaced transducers at 90 in FIGS. 1 and 8 to switch the field windings in a conventional manner. In FIG. 1, just one transducer is illustrated at 90, while in FIG. 8, the angularly spaced mounting bolts for the transducers are illustrated penetrating the bottom of the circuit board 98 at 90.

Referring again to FIG. 1, the motor 16, the grounding arrangement 65, and associated transducers and circuitry are disposed outside of the enclosure 30. Thus, a penetration for the shaft 14 must be established. According to the present invention, a shaft penetration assembly comprises a cylindrical portion 92 of recorder frame 18 with the shaft 14 extending therethrough. A cylindrical sheet metal or plastic cup 93 is mounted concentric with the axial centerline 69 of the shaft 14, the cup 93 being mounted to the bottom portion of enclosure 30 to act as an extension of the enclosure. An annular elastomeric seal 94 is disposed in the top of the cup, the seal surrounding and sealing the cup 93 to the cylindrical portion 92 of the recorder frame 18. This penetration and sealing arrangement is superior to that used on prior art disc recorders of this type, since in the prior art, a chevron or similar seal was provided that actually engaged the rotating shaft 14. Since the shaft 14 normally rotates on the order of 2400 rpm, prior art seals could be worn out after long periods of operation. In the present case, the seal 94 has an indefinite life span since there is no relative motion between the cylindrical portion 92 of frame 18 and the seal 94.

Figure 8:
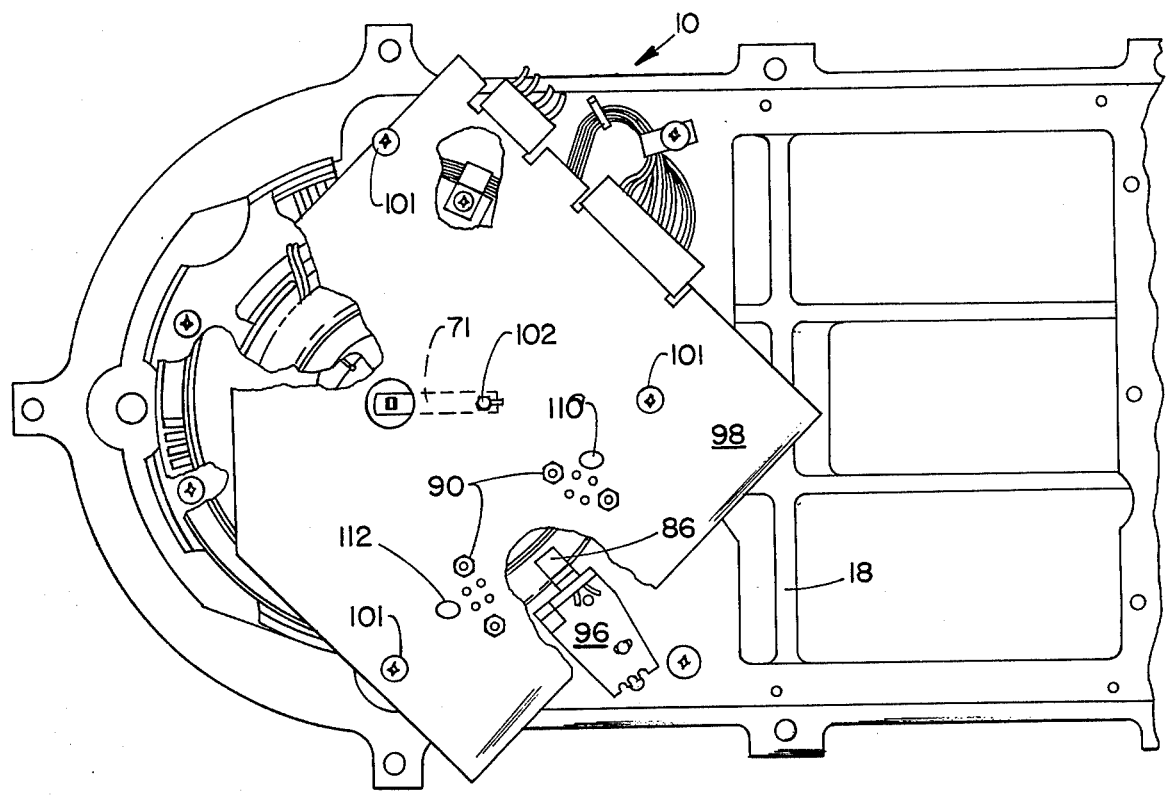
FIG. 8 is a bottom view, partially in section, of the drive spindle assembly of FIG. 1.

The drive spindle assembly 10 is a compact unit which need not be substantially higher than the desired medical length for the shaft 14 between support bearings 21 and 22. The length is a spacing sufficient to preclude cocking or twisting off center excursions of the shaft within its mounts during any expected condition of operation. In this case, the height of the drive spindle assembly 10 is minimized by recessing the stator winding 45 into both the cylindrical cup 93 and the commutator disc 55. The commutator disc 55, transducers 86 and 90, and associated speed regulation, disc indexing and motor switching circuitry are provided in a compact arrangement that involves positioning of first and second signal paths 80 and 81 along mutually orthogonal circular paths on commutator disc 55. One of either the first or second signal paths 80 or 81, respectively, is disposed in a plane orthogonal to the axis of rotation of the shaft 14. In this case, it is the first signal path 80 that is orthogonal to the centerline 69 and referring briefly to FIG. 9, it is seen that the transducer 86 is mounted adjacent the first signal path 80 by securing the transducer to an L-shaped bracket 96 which is bolted or otherwise suitably secured to enclosure 30 which extends in a second plane orthogonal to the axis of rotation 69 of the shaft 14 and parallel to the plane in which the first signal path 80 is disposed. Referring again to FIG. 1, the circuit board 98 is mounted in a fixed relationship with respect to the frame 18 parallel to the commutator disc 55. The circuit board stands on lugs 100 threaded through the enclosure 30 and into the frame 18. Bolts 101 extend into lugs 100 to secure the circuit board 98 in a fixed relationship with the frame 18. The circuit board 98 carries speed, disc indexing and motor commutation circuits; and the leaf spring 71 of the grounding arrangement 65. Referring briefly to FIG. 8, the leaf spring 71 is secured by a bolt or other suitable means to the circuit board 98 at 102 and is cantilevered from the circuit board 98 to provide upward pressure on the carbon sphere, urging it into the socket carried on shaft 14.

Referring to FIG. 8 it is illustrated that the printed circuit board 98 includes peep holes 110 and 112. When the board 98 is attached to the disc assembly it is essential that the signal path 81 on the commutator disc 55 is correctly aligned with the sensors 90. Referring now also to FIG. 7, to facilitate alignment of the disc 55, whitened areas or timing marks 114 and 116 are provided. The timing marks 114 and 116 and the peep holes 110 and 112 are arranged such that when the marks 114 and 116 are visible in holes 110 and 112, respectively, the commutator disc 55 and printed circuit board 98 are properly aligned. The marks 114 and 116 are preferably disposed on opposite ends of the sector 118 of the second signal path 81.

The above description should be considered as exemplary and that of the preferred embodiment only. The true spirit and scope of the present invention should be determined by reference to the appended claims. It is desired to include within the appended claims all modifications that come within the proper scope of the invention.

The embodiments of the invention in which an exclusive property or privilege is claimed are defined as follows:

1. A disc-drive spindle assembly and means for mounting the same in a disc recorder comprising in combination:
   a disc recorder frame;
   a sealed enclosure surrounding said frame;
   a disc rotor disposed within said enclosure for mounting a recording disc and circulating air within said enclosure;
   a brushless DC motor;
   bearing means disposed in said frame;
   a shaft supported by said bearing means, said shaft extending outside said sealed enclosure and directly coupling said disc rotor and said motor;
   means for grounding said shaft including a socket which comprises:
   an electrically conductive plug fixedly disposed on the axial centerline of said shaft;
   a carbon sphere disposed in said plug; and an electrically conductive leaf spring contacting and urging said sphere into said socket, said spring being electrically connected to ground;

whereby contamination with said sealed enclosure is minimized.

2. The disc-drive spindle assembly of claim 2 wherein said socket in cross section comprises a conical portion and a cylindrical portion, the apex of said conical portion forming the deepest portion of said socket, the axial centerlines of said conical and cylindrical portions being disposed on the axial centerline of said shaft.

3. The disc-drive spindle assembly of claim 2 wherein said sphere contacts said socket only in said conical portion of said socket.

4. The disc-drive spindle assembly of claim 1 further including a transducer disc mounted on the end of said shaft said transducer disc including first and second signal paths, said first signal path providing a signal for regulating the speed of said motor and said second signal path providing a signal for electronic commutation of said motor.

5. The disc-drive spindle assembly of claim 4 further including a circuit board mounted on said frame, said circuit board including commutation transducers, speed regulation and commutation circuits, and means for grounding said shaft.

6. The disc-drive spindle assembly of claim 1 further including a penetration assembly in said enclosure said shaft extending through said penetration assembly and said motor being disposed outside of said enclosure.

7. The disc-drive spindle assembly of claim 6 wherein said penetration assembly comprises:
a cylindrical portion of said frame, said shaft extending from said cylindrical portion of said frame;
a cylindrical cup-like element mounted concentric with the axial centerline of said shaft, said cup-like element being mounted to act as an extension of said enclosure; and
an elastomeric seal disposed in said cup-like element, said elastomeric seal surrounding and sealing said cup-like element to said cylindrical portion of said frame.

8. The disc-drive spindle assembly of claim 7 wherein said motor comprises a permanent magnet rotor disposed on said shaft and a stator winding surrounding said permanent magnet rotor, said stator winding being at least partially recessed in said cup.

9. The disc-drive spindle assembly of claim 8 further including a commutator disc mounted on the end of said shaft outside of said enclosure, said commutator disc including first and second signal paths, said first signal path providing a signal for regulating the speed of said motor and said second signal path providing a signal for electronic commutation of said motor.

10. The disc-drive spindle assembly of claim 9 wherein said stator winding is at least partially recessed in said commutator disc.

11. The disc-drive spindle assembly of claim 9 further including a circuit board disposed outside said enclosure standing on lugs threaded through said enclosure and into said frame.

12. The disc-drive spindle assembly of claim 9 further including a circuit board disposed outside said enclosure mounted in a fixed relationship with said frame parallel to said commutator disc for supporting control circuits, commutation transducers and means for grounding said shaft.

13. The disc-drive spindle assembly of claim 12 wherein said commutator disc comprises a chopper wheel and said first and second signal paths comprise first and second, mutually orthogonal, signal paths, one of said first and second signal paths being disposed in a plane parallel to said circuit board.

14. The disc-drive spindle assembly of claim 12 wherein said circuit board includes a pair of peep holes and said commutator disc includes a pair of timing marks whereby said commutator transducers are properly aligned with said commutator disc by aligning said timing marks to be visible in said peep holes.

15. The disc-drive spindle assembly of claim 6 wherein said motor includes a four magnetic pole permanent magnet rotor disposed on said shaft.

16. The disc-drive spindle assembly of claim 15 wherein said motor further includes a stator winding surrounding said permanent magnet rotor, said winding establishing a rotating magnetic field for driving said permanent magnet rotor.

* * * * *

UNITED STATES PATENT AND TRADEMARK OFFICE
CERTIFICATE OF CORRECTION

PATENT NO. : 4,216,512
DATED : August 5, 1980
INVENTOR(S) : Mohan P. Vidwans

It is certified that error appears in the above-identified patent and that said Letters Patent are hereby corrected as shown below:

In The Title:

After "DRIVE" insert --AND IMPROVED GROUND--

Column 1, Line 1:

After "DRIVE" insert --AND IMPROVED GROUND--

Column 1, Line 10:

"of" should be --to--

Column 2, Line 25:

1st occurrence of "of" should be --for--

Column 2, Line 67:

"chips" should be --clips--

Column 3, Line 30:

"object" should be --subject--

UNITED STATES PATENT AND TRADEMARK OFFICE
CERTIFICATE OF CORRECTION

PATENT NO. : 4,216,512
DATED : August 5, 1980
INVENTOR(S) : Mohan P. Vidwans

It is certified that error appears in the above—identified patent and that said Letters Patent are hereby corrected as shown below:

Column 5, Line 4:

"in" should be --is--

Column 7, Line 6, Claim 2:

"2" should be --1--, after claim

Signed and Sealed this

Third Day of February 1981

[SEAL]

Attest:

RENE D. TEGTMEYER

Attesting Officer   Acting Commissioner of Patents and Trademarks